United States Patent
Haeberer

(10) Patent No.: US 8,915,068 B2
(45) Date of Patent: Dec. 23, 2014

(54) DEVICE FOR REDUCING POLLUTANTS IN THE EXHAUST GAS FLOW OF AN INTERNAL COMBUSTION ENGINE

(75) Inventor: Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 13/696,729

(22) PCT Filed: Apr. 18, 2011

(86) PCT No.: PCT/EP2011/056084
§ 371 (c)(1),
(2), (4) Date: Nov. 7, 2012

(87) PCT Pub. No.: WO2011/141278
PCT Pub. Date: Nov. 17, 2011

(65) Prior Publication Data
US 2013/0048120 A1    Feb. 28, 2013

(30) Foreign Application Priority Data
May 11, 2010    (DE) .......................... 10 2010 028 863

(51) Int. Cl.
*F01N 3/00*    (2006.01)
*F01N 3/20*    (2006.01)

(52) U.S. Cl.
CPC ........... *F01N 3/2066* (2013.01); *F01N 2610/14* (2013.01); *F01N 2610/1426* (2013.01); *F01N 2610/144* (2013.01); *F01N 2610/1493* (2013.01); *Y02T 10/24* (2013.01)
USPC ..................... 60/295; 60/286; 60/301; 60/303

(58) Field of Classification Search
CPC .............................................. F01N 2900/1814
USPC .............................. 60/286, 295, 297, 301, 303
See application file for complete search history.

(56) References Cited

U.S. PATENT DOCUMENTS

| | | | | |
|---|---|---|---|---|
| 4,132,194 A | * | 1/1979 | Saito | 123/672 |
| 5,915,352 A | * | 6/1999 | Okamoto et al. | 123/298 |
| 7,393,187 B2 | | 7/2008 | Weigl | |
| 8,047,452 B2 | * | 11/2011 | Martin et al. | 239/5 |
| 8,225,602 B2 | * | 7/2012 | Cavanagh et al. | 60/295 |
| 8,261,537 B2 | * | 9/2012 | Osbat et al. | 60/286 |

(Continued)

FOREIGN PATENT DOCUMENTS

WO    2008/031421    3/2008

OTHER PUBLICATIONS

PCT/EP2011/056084 International Search Report dated Jul. 7, 2011 (English Translation and Original, 4 pages).

*Primary Examiner* — Binh Q Tran
(74) *Attorney, Agent, or Firm* — Michael Best & Friedrich LLP

(57) ABSTRACT

A device (40) for reducing pollutants, in particular nitrogen oxides, in an exhaust gas flow of an internal combustion engine, includes a reducing agent (46), in particular a urea-water solution, which is stored in a storage tank (42), a metering module, in particular a nozzle (68), for injecting the reducing agent (46) into the exhaust gas flow, and a pump (56, 100) for delivering the reducing agent (46) from a suction point (62) in the storage tank (42) to the metering module via lines (58, 66). A pump (56, 100) lies beneath a reducing agent level (44) in the storage tank (42), and a non-return valve is provided.

17 Claims, 2 Drawing Sheets

(56) References Cited

U.S. PATENT DOCUMENTS

| | | | |
|---|---|---|---|
| 8,359,831 B2 * | 1/2013 | Chmielewski et al. | ......... 60/286 |
| 2004/0047783 A1 | 3/2004 | Huber et al. | |
| 2004/0179960 A1 | 9/2004 | Lenke | |
| 2009/0101656 A1 | 4/2009 | Leonard | |
| 2009/0230136 A1 | 9/2009 | Dougnier et al. | |

* cited by examiner

DEVICE FOR REDUCING POLLUTANTS IN THE EXHAUST GAS FLOW OF AN INTERNAL COMBUSTION ENGINE

BACKGROUND OF THE INVENTION

In motor vehicles with internal combustion engines, increasingly stringent exhaust-gas limit values require the reduction, inter alia, of atmospheric pollutants such as for example nitrogen oxides (NOx) in the exhaust gas stream. One widespread method which is used for such purposes is catalytic reduction, i.e. the "SCR" ("Selective Catalytic Reduction") method. In this method, a liquid reducing agent is delivered by means of a pump from a storage container to a feed module in the region of a catalyst on the exhaust gas pipe during operation of the internal combustion engine. The reducing agent used generally takes the form of a urea/water solution with the brand name "AdBlue®". Account needs to be taken of the fact that this urea/water solution freezes at a temperature of −11° C. and decomposes thermally above 60° C., such that heating devices have to be provided in particular for low-temperature winter operation. To ensure the necessary frost resistance of the exhaust-gas purification system at low operating temperatures in the region of −11° C. and below, the reducing agent is aspirated completely back out of the feed module, the lines and the delivery device into the storage tank once the internal combustion engine has been turned off. In the process, air and/or residual exhaust gas flows into the cavities left empty by the reducing agent when it is pumped out.

The principle problem of this return procedure is the spatial arrangement of the pump below the liquid level in the storage tank, which may however be necessary due to specific structural requirements. This is because on the one hand the inlet and outlet valves of the delivery module do not close absolutely tightly and on the other hand the feed module on the exhaust gas line is not hermetically gas-tight, such that the complete system, in particular with prolonged down times, can slowly fill back up with the reducing liquid after completion of the return process. This is all the more the case given that the nozzle for injecting the reducing agent is generally positioned in the region of the lowest point of the system, i.e. directly on the exhaust gas pipe or on the catalytic converter. If the pump and the nozzle including the connecting lines are not ice-pressure resistant, i.e. burst-resistant in the event of cooling-related volumetric expansion of the reducing agent, they may be damaged when the volume increases during the phase transition of the reducing agent from liquid to solid, so making the exhaust-gas purification system no longer functional.

Solutions known from the prior art have hitherto dealt with this problem by always positioning the pump above the liquid level in the storage tank, so ensuring that the reducing agent cannot flow back under the effect of gravity. However, this structural situation significantly restricts the installation space available for incorporating the exhaust-gas aftertreatment system into the motor vehicle. Alternatively, a siphon may be provided between the delivery pump and the intake point, the elbow of which lies above the liquid level of the reducing agent. With regard to the spatial arrangement of its components, the second variant solution allows greater flexibility, but has the disadvantage that, due to the siphon and the consequently longer line arrangements, a greater line length has to be heated to ensure winter operation, so increasing the energy input for the heating and at the same time also the space required for the lines.

A system is known from DE 10 2006 044 246 A1 for aftertreatment of an exhaust gas from an internal combustion engine with a reducing agent, wherein the reducing agent is delivered from a storage container to a nozzle arranged on a catalytic converter with the assistance of a hydraulically driven diaphragm pump. In the process, the diaphragm pump builds up sufficient operating pressure for the process of injecting the reducing agent. However, the system does not disclose any means of aspirating the reducing agent back out of the line arrangement once the internal combustion engine has been turned off and moreover does not disclose any precautions for ensuring a hermetic seal against the reducing agent flowing back once it has been aspirated out.

It is therefore an object of the invention to provide a device for a reducing agent for cutting levels of atmospheric pollutants, in particular nitrogen oxides (NOx), in the exhaust gas of an internal combustion engine, in which the reducing agent is reliably prevented from flowing back out of the storage tank into the system once the engine has been turned off and the reducing liquid return process is complete.

SUMMARY OF THE INVENTION

A device for reducing nitrogen oxides in the exhaust gas stream of an internal combustion engine is proposed which comprises, inter alia, a storage tank containing the reducing agent, a feed module, in particular a nozzle, for injecting the reducing agent into the exhaust gas stream and a pump for delivering the reducing agent from an intake point in the storage tank via lines to the feed module.

According to the invention, the pump is arranged below the level of the reducing agent in the storage tank and a backflow barrier prevents the reducing agent from flowing back undesirably to the nozzle, in particular due to the effect of gravity and incompletely closing valves in the pump, once it has been aspirated back out of the exhaust gas aftertreatment system after the internal combustion engine has been turned off.

In a first variant, the backflow barrier is embodied by a filter disposed upstream of the pump intake line, said filter taking the form of at least two close-meshed plastics screens arranged in series. Due to the microstructure of the screens, fine exhaust gas and air bubbles settle in the screen mesh during return of the reducing agent. In this way, the gas-filled screen achieves hydrophobic characteristics, while the reducing agent is hydrophilic due to its water content. The hydrophobicity of the screen thus reliably prevents backflow after the engine has been turned off, since the relatively low static pressure of the reducing agent is insufficient to overcome the water-repellent effect of the air- and exhaust gas-filled screens. When the internal combustion engine is started up again, however, the pump used for delivery produces a vacuum in the region of the filter, which is sufficient to overcome the repulsive forces brought about by the filter screens and the reducing agent is again able to flow unimpeded through the filter.

In the case of a second variant, the backflow barrier is implemented technically with a sealing edge which, when idle, i.e. when the pump used to deliver the reducing agent is in a de-energized state, is pressed with a defined level of mechanical contact pressure against a rubberized limit stop. This brings about a reliable, hermetic seal between the storage tank with the reducing agent and the inlet of the pump, which prevents uncontrolled backflow of the reducing agent when the internal combustion engine is turned off. A particular advantage of this configuration is that the backflow barrier is incorporated directly into the pump, such that no further components are necessary. An external shut-off valve, optionally requiring heating, or the filter in accordance with the first variant embodiment may be dispensed with, thereby significantly reducing the cost and effort required to produce the device.

BRIEF DESCRIPTION OF THE DRAWINGS

The invention will now be explained in greater detail with reference to the drawings, in which.

DETAILED DESCRIPTION

Figure 1:
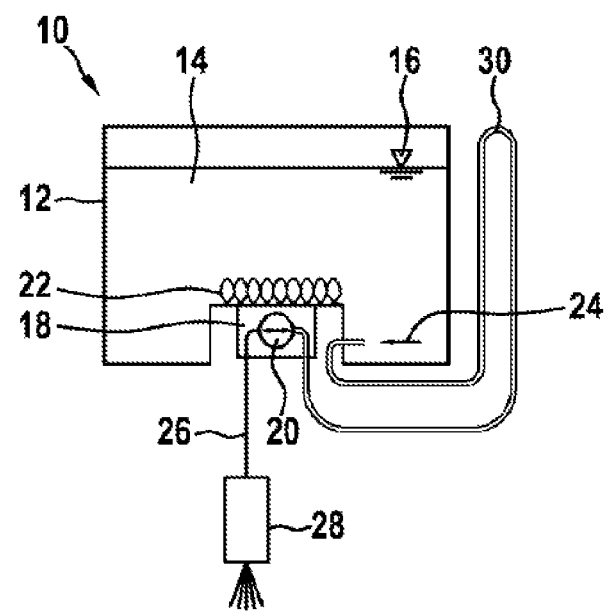
FIG. 1 shows a device for treating exhaust gas, in accordance with the prior art.

FIG. 1 shows a device known from the prior art for treating the exhaust gas of an internal combustion engine, in particular of a diesel engine. The device 10 comprises inter alia a storage tank 12, which is filled with a reducing agent 14, for example a urea/water solution, for chemically reducing the nitrogen oxides contained in the exhaust gas stream from an internal combustion engine.

The storage tank 12 is conventionally filled up to a reducing agent level 16 and then contains between 10 l and 20 l of the reducing agent 14. At the bottom, a functional module 18 is welded into the storage tank 12 or attached in some other way. This comprises inter alia a pump 20 and an electrical heating unit 22. The pump 20 may deliver the reducing agent 14 both from the storage tank 12 to the nozzle 28 and in the opposite direction from the nozzle 28 back into the storage tank 12. Furthermore, the functional module 18 comprises a plurality of measuring sensors, such as for example temperature sensors, pressure sensors, sensors for measuring flow, level gauges, position sensors and an open- and/or closed-loop control unit. By means of the pump 20, the reducing agent 14 is delivered during operation of the internal combustion engine from an intake point 24, which is preferably arranged in the region of the lowest point of the storage tank 12, the "pump sump", via a line 26 to the nozzle 28. The nozzle 28 allows finely divided, disperse injection of the reducing agent 14 into the catalytic converter of the exhaust gas line of the internal combustion engine, which is not shown in FIG. 1 for the sake of greater drawing clarity. In general, the nozzle 28 simultaneously has a valve function, i.e. injection of the reducing agent 14 proceeds only once a defined minimum pressure is reached. Once the internal combustion engine has been turned off, the reducing agent 14 is initially aspirated completely back out of the nozzle 28, the line 26 and a siphon 30 to the storage tank 12 by means of the pump 20, which is then operating in reverse mode. In the process, the stated components of the system fill up with residual quantities of the gas from the exhaust gas system of the internal combustion engine.

Uncontrolled backflow of the reducing agent 14, in particular in the case of prolonged internal combustion engine shutdown, is prevented by the siphon 30. Although the above-explained device optionally also allows arrangement of the pump 20 of the exhaust gas aftertreatment system below the reducing agent level 16 in the storage tank 12, the need for the siphon 30 increases the line length which has to be provided and which has to be heated to ensure functionality of the device 10 at low temperatures.

Figure 2:
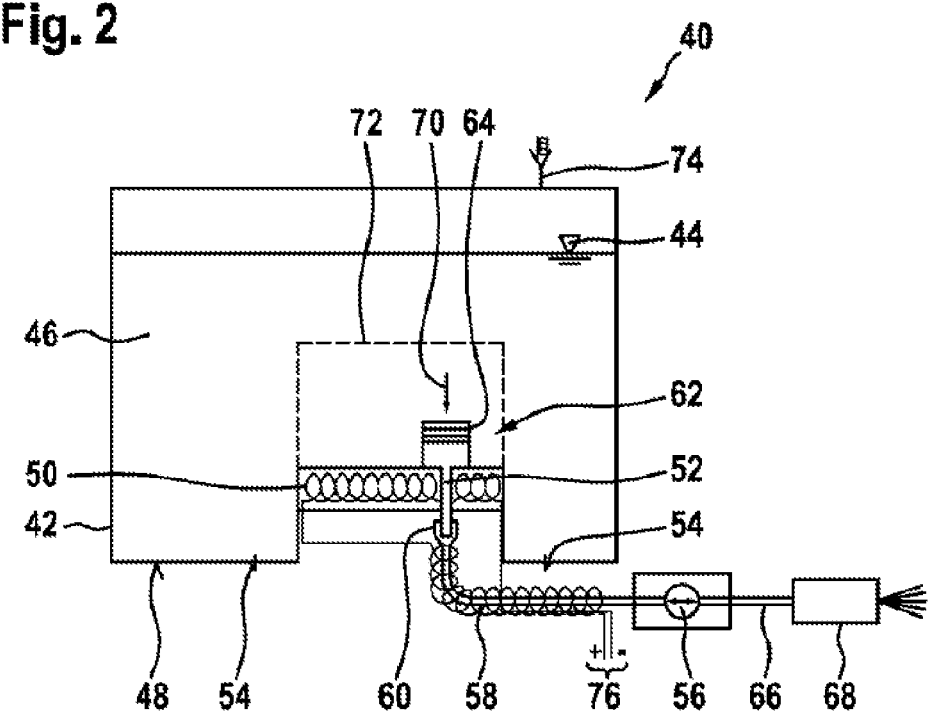
FIG. 2 shows a first variant embodiment of the device according to the invention.

FIG. 2 illustrates a first variant of the device according to the invention. A device 40 inter alia comprises a storage tank 42 which is filled up to a reducing agent level 44 with a reducing agent 46. The reducing agent 46 is preferably a urea/water solution, by means of which efficient reduction of nitrogen oxides (NOx) in the exhaust gas of a internal combustion engine is achieved, the reducing agent being injected in a finely divided manner by a nozzle into a catalytic converter through which the exhaust gas stream flows. An electrical (resistance) heating unit 50 with a passage 52 for the reducing agent 46 is located on the bottom 48 of the storage tank 42, in the region of a raised portion, not shown. The heating unit 50 is joined to the bottom 48 of the storage tank 42 by a weld seam 54. A pump 56 is additionally provided, which is connected via a line 58 to the passage 52. The line 58 may for example take the form of a flexible hose line and be fastened to the passage 52 with a clip 60. In this variant, a backflow barrier in the form of a filter 64 is located in the region of an intake point 62. The pump 56 is connected via a further line 66 to the nozzle 68, by means of which the reducing agent 46 is injected in a finely atomized manner into an exhaust gas line, not shown in FIG. 2, of an internal combustion engine. The nozzle 68 also has a valve function in addition to its primary atomizing function, i.e. injection of the reducing agent 46 only proceeds once a predetermined minimum pressure has been exceeded. As is clear from the illustration in FIG. 2, both the storage tank 42 and the line 58 leading to the pump 56 may be electrically heated by means of the heating unit 50.

As is indicated by the small black double-headed arrow in the pump symbol, the pump 56 is configured such that it is able to deliver the reducing agent 46 both in a (main) delivery direction from the storage tank 42 to the nozzle 68 and in a reverse return direction from the nozzle 68 back into the storage tank 42 again.

In addition, the device has a plurality of sensors, not shown for the sake of greater drawing clarity, for example at least one pressure sensor, a temperature sensor, a filling level sensor and optionally a sensor for precise flow measurement, in order to identify the physical parameters relevant to functioning of the device 40 to ensure the reducing agent 46 is injected in a precise, metered amount, which parameters are additionally optimally adapted to the current operating state of the internal combustion engine, so as in particular to optimize consumption of the reducing agent 46. In addition, an open- and/or closed-loop control unit, likewise not shown, is provided for controlling all the operating sequences within the device 40, the sensors, the pump 56 and the heating unit 50, inter alia, being connected to said control unit. For example, the heating unit 50 may be switched on automatically by means of the open- and/or closed-loop control unit, if a temperature sensor signals that the temperature of the reducing agent 46 has fallen below or reached its freezing temperature of −11° C., the internal combustion engine has been turned off and the return of the reducing agent has not yet taken place.

Due to its special microstructure, the filter 64 provided according to the invention prevents backflow of the reducing agent 46 out of the storage tank 4 when the internal combustion engine is turned off, but allows unhindered flow of the reducing agent 46 through the passage 52 in the direction of the black arrow 70 when the internal combustion engine is in operation. Reference is made to the description of FIG. 3 for the further structural details of the structure of the filter 64 and its mode of operation. A (coarse) purification filter 72 is connected upstream of the filter 64, to prevent the device 40 from becoming clogged or contaminated with foreign bodies, which may be present in the reducing agent 46. The storage tank 42 additionally has a vent valve 74 arranged at the top. The electrical heating unit 50 is supplied with power via an electrical (plug-in) connection 76.

Figure 3:
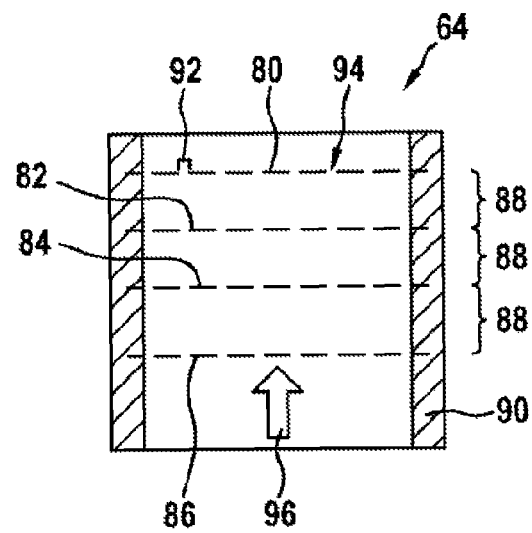
FIG. 3 is a detail view of the filter used in the first variant embodiment according to FIG. 2.

FIG. 3 illustrates a possible embodiment of the filter 64 in accordance with FIG. 2.

In the exemplary embodiment shown, the filter 64 comprises four series-connected screens 80 to 86, which are each accommodated with a spacing 88 of between 1 mm and 5 mm in a housing 90. The mesh size 92 of the opening 94, which is provided with a reference numeral representatively for all the others, in the screens 80 to 86 preferably amounts in each case to between 10 µm and 50 µm. As shown in FIG. 3, it is not necessary for the spacing 88 between the screens 80, 82 to be constant for all further screens. It is also possible to select different mesh sizes for each of the screens 80 to 86. The screens 80 to 86 are preferably made from a thermoplastic material, for example of polyamide (PA). Others plastics materials, such as for example polyethylene (PE) or polytetrafluoroethylene (PTFE), may likewise be used to produce the screens.

When the reducing agent is aspirated back through the filter 64 in the direction of the large white arrow 96 by means of the pump which is then operating in the return direction (cf. FIG. 2), the residual exhaust gas taken in therewith or the air from the exhaust gas line, not shown, arrives between the screens 80 to 86 and thus also enters the openings 94. The entrained air bubbles which form close up the openings in the screens 80 to 86 due to their inherent surface tension, such that the filter 64 becomes water-repellent, i.e. hydrophobic. Once the internal combustion engine has been turned off, the water-containing reducing agent 46 can therefore no longer pass through the completely gas-filled, hydrophobic filter 64 contrary to the direction of arrow 96 due to its only low inherent static pressure. This reliably prevents the slow "trickle" of reducing agent 46 into the pump 56, including the lines 58, 66 and the nozzle 68, and the associated undesired consequences, in particular during prolonged internal combustion engine shutdown (cf. FIG. 2). When the internal combustion engine is started up again, the pump 56 aspirates the reducing agent 46 contrary to the direction of the arrow 96 through the filter 64, simultaneously expelling the gas or quantities of residual exhaust gas out of the filter 64. Aspirating the gas back off renders the filter 64 hydrophilic again, so that it allows reducing agent to pass through unimpeded.

A slow "trickle" of reducing agent 46 into the exhaust gas treatment system is problematic in particular because on the one hand at low temperatures it leads to freezing of the reducing agent and associated consequences if the system is not 100% ice-pressure resistant and on the other hand reducing agent 46 dripping out slowly but constantly in the region of the nozzle 68 results in crystallization. Said crystallization, which increases maintenance work, at the very least inhibits outlet of the reducing agent 46 and reduces atomization, i.e. the dispersion action of the nozzle 68, which at the same time impairs the catalytic reduction action in the exhaust gas stream. In any event, uncontrolled flow of the reducing agent 46 back in after it has been aspirated out of the exhaust gas treatment system results in undesirable functional impairment.

Figure 4:
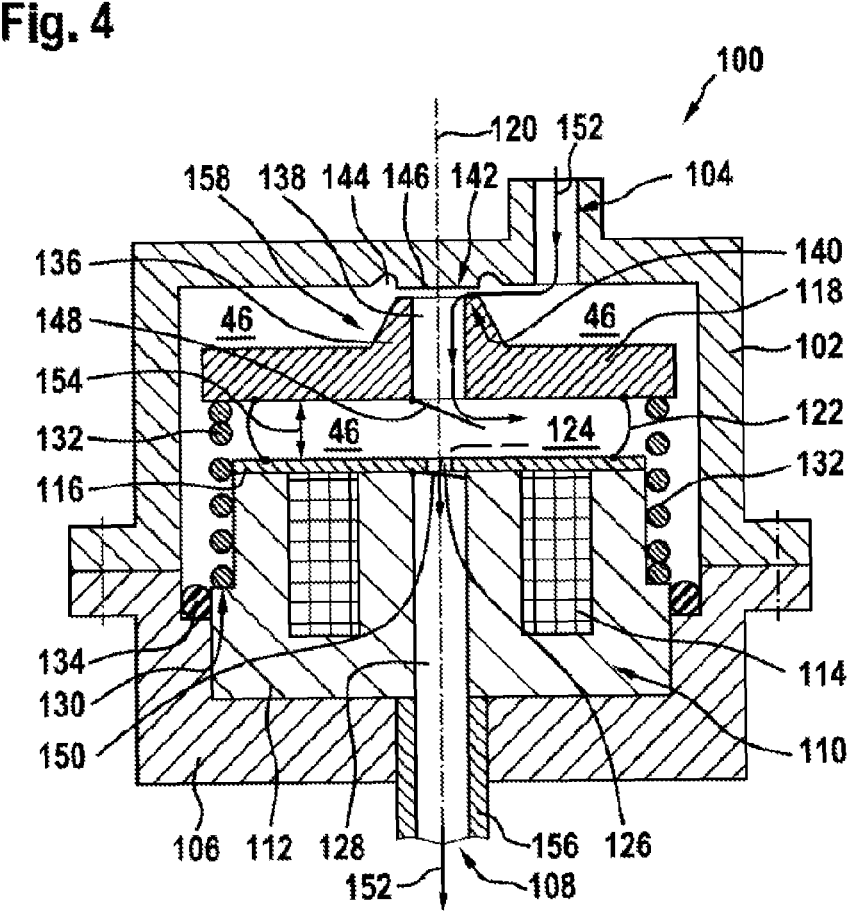
FIG. 4 is a schematic sectional representation of the pump with integral backflow barrier used in the second variant embodiment.

FIG. 4 shows an exemplary embodiment of a second embodiment of the device 40 according to the invention, not shown in full here however for the sake of greater drawing clarity, in which a pump is used which has an automatically closing valve as backflow barrier.

A pump 100 comprises inter alia a housing top 102 with an inlet 104 and a housing bottom 106 with an outlet 108 for the reducing agent 46. The housing parts 102, 106 are joined together for example by a flange and bolt joint, not shown. In the housing bottom 106 there is located an electromagnet 110, which comprises a magnetic core 112 and a cylindrical coil 114. The electromagnet 110 is covered with an isolating disc 116, which is preferably formed of a non-magnetic material (air gap effect), to prevent it from sticking magnetically to the armature plate. The magnetic core 112, on the other hand, is made of a magnetic material preferably with a laminated structure so as better to direct and intensify the magnetic flux of the electromagnet 110. In the region of the housing top 102 there is located a disc-shaped armature plate 118, which is displaceable substantially parallel to an axis of symmetry or longitudinal axis 120 of the pump 100 due to the magnetic force action of the electromagnet 110. Between the armature plate 118 and the isolating disc 116, which is firmly connected to the magnetic core 112 of the electromagnet 110, a peripheral resilient sealing membrane 122 is provided to define at least in part a delivery chamber 124 and to guide the armature plate 118. The sealing membrane 122 may be formed of any desired resilient material, which has however to display sufficient resistance relative to the reducing agent 46. A suitable example is an elastomer, such as for example rubber or a resilient membrane (bellows), which is made of a stainless steel alloy.

A continuous isolating disc and magnetic core bore 126, 128 is introduced into the isolating disc 116 and magnetic core 112, wherein the diameter, not shown, of the isolating disc bore 126 is preferably less than the diameter of the magnetic core bore 128. A pretensioned compression spring 132 is located between a magnetic core recess 130 and the armature plate 118, wherein the magnetic core 112 is sealed in the region of this recess relative to the housing bottom 106 by means of a resilient seal, in particular an O-ring 134.

A conical raised part 136 of the armature plate 118, arranged centrally thereon and into which a continuous armature plate bore 138 is introduced to create a sealing edge 140, is pressed under the force of the compression spring 132, when the electromagnet 110 is in the de-energized state, with a defined contact pressure of 1 N to 10 N, preferably however more than 10 N, against a limit stop 142 in the region of the housing top 102, in order to achieve hermetically tight closure of the inlet 104 when the internal combustion engine is turned off and the pump 100 is in the de-energized state. The limit stop 142 is surrounded by an annular groove 144, in order in particular to counter the occurrence of stress cracking in the housing top 102. To improve the sealing action, the limit stop 142 is provided with a preferably circular rubber coating 146. This may for example be vulcanized onto the limit stop 142. Instead of the rubber coating 146, it is also possible to use any desired thermoplastic or thermosetting plastics material as the sealant. To achieve pulsing pump operation through periodic energization of the electromagnet 110 by means of the open- and/or closed-loop control unit, an inlet valve 148 is provided in the region of the armature plate bore 138 and an outlet valve 150 is provided in the region of the magnetic core bore 128.

The situation illustrated in FIG. 4 almost corresponds (since in the position shown of the armature plate 118 there is still a narrow gap (not shown) between the conical raised portion 136 and the limit stop 142) to a idle state of the pump 100, in which the armature plate 118 is pressed firmly against the housing top 102 by the compression spring 132 when the electromagnet 110 is de-energized.

Both the inlet valve 148 and the outlet valve 150 are constructed, by way of example, as flap valves and are not passively opened and closed by the reducing agent 46 flowing through them or as a function of the flow direction, but rather may be opened and closed under the control of the above-mentioned open- and/or closed-loop control unit by means of actuators, not shown. Instead of the embodiment shown of the inlet and outlet valves 148, 150 in the form of flap valves, ball valves may for example also be used.

The direction of flow, i.e. the normal (main) delivery direction of the reducing agent 46 to be delivered by means of the pump 100, is indicated by the black arrow line 152. The armature plate 118 travels a travel distance 154 in each case when the electromagnet 110 is energized or, as a result of the restoring action of the compression spring 132, when the electromagnet 110 is de-energized, which is parallel to the longitudinal axis 120 and which is defined at the top by the limit stop 142 and at the bottom by the isolating disc 116. The magnetic core 112 or the magnetic core bore 128 is continued downward into a delivery pipe 156, which is if necessary connected directly to the catalytic converter used for exhaust gas purification in the exhaust gas line of the internal combustion engine. The outlet valve 150 is connected to the isolating disc 116 for example by a peripheral weld seam. In cooperation with the rubberized limit stop 142 and the contact pressure built up by the compression spring 132, the sealing edge 140 constitutes a hermetically sealing valve 158, which, when the internal combustion engine is turned off, reliably prevents the reducing agent 46 from flowing out of the storage tank (cf. FIG. 2), not shown here, via the inlet 104 or the not completely tightly closing inlet and outlet valves 148, 150 of the pump 100.

To prepare for delivery of the reducing agent 46, i.e. in particular after a prolonged internal combustion engine shutdown and with the device completely emptied of any residue, the electromagnet 110 is energized in a controlled manner by the open- and/or closed-loop control unit, whereby the armature plate 118 moves downward parallel to the longitudinal axis 120 over the travel distance 154 and strikes against the isolating disc 116. At the same time, the open- and/or closed-loop control unit opens the inlet valve 148 and closes the outlet valve 150, such that the delivery chamber 124 arising above the armature plate 118 may fill up at least partially with the reducing agent 46 as a result of the static pressure.

Once the electromagnet 110 has been switched off, the armature plate 118 is forced back upwards by the compression spring 132 as far as the limit stop 142, wherein the inlet valve 148 is at the same time held open, in order to allow the reducing agent 46 to flow into the delivery chamber 124 volume enlarging in the process. Once the armature plate 118 reaches its upper end position against the limit stop 142, the valve 158 consisting of the sealing edge 140 and the limit stop 142 closes automatically while the open- and/or closed-loop control unit closes the inlet valve 148, in order to prevent further reducing agent 46 from being aspirated in via the inlet 152 on a renewed downward movement of the armature plate 118 caused by renewed energization of the electromagnet 110. To control the inlet and outlet valves 148, 150, position sensors may be provided, not shown in FIG. 4, which output signals to the open- and/or closed-loop control unit as to whether the armature plate 118 is located against the limit stop 142, is briefly occupying an intermediate position or is resting firmly against the isolating disc 116.

In order now to be able to discharge reducing agent 46 located in the delivery chamber 124 in the delivery direction of the pump 100, i.e. parallel to the arrow line 152, the electromagnet 110 is again energized, wherein the open- and/or closed-loop control unit opens the outlet valve 150 and keeps the inlet valve 148 closed. In this way, the quantity of reducing agent 46 located in the delivery chamber 124 is delivered out of the pump 100 through the delivery pipe 156 or the outlet 108 at a pressure of up to 10 bar. This delivery process is repeated over the entire service life of the internal combustion engine by periodic energization or de-energization of the electromagnet 110 and corresponding activation of the inlet and outlet valves 148, 150, in order to deliver the reducing agent 46 in the (main) delivery direction of the pump 100 in each case in defined volume units in a pulsed manner from the inlet 104 to the outlet 108 of the pump 100, and thus to bring about the desired, continuous catalytic reduction of the nitrogen oxides in the exhaust gas of the internal combustion engine while the latter is in operation.

In order to be able to aspirate the reducing agent 46 contained in the device completely back into the storage tank when the internal combustion engine is turned off, i.e. to achieve complete emptying of the device, it is necessary to operate the pump 100 in the "return" direction. This means that the reducing agent 46 flows through the pump 100 contrary to the direction of the arrow line 152. To explain what takes place during the return process, it is assumed in the remainder of the description that the delivery chamber 124 is completely full of reducing agent 46 and the armature plate 118 is in the position indicated in FIG. 4.

First of all the electromagnet 110 is energized, such that the armature plate 118 moves from its idle position downward toward the isolating disc 116. At the same time, both the inlet valve 148 and the outlet valve 150 are opened. As a result of the open valves 148, 150, the armature plate 118 may move downward virtually without resistance, irrespective of the fact that the delivery chamber 124 is at this point still completely full of reducing agent 46, wherein, during this process, due to the relatively low static pressure in conjunction with the inertia of said reducing agent 46 in the storage tank, only a negligible quantity continues flowing from the storage tank into the pump 100.

When the electromagnet 110 is de-energized again, the compression spring 132 forces the armature plate 118 back into its upper idle position, wherein the volume of the delivery chamber 124 increases and the resultant vacuum generated thereby in the delivery chamber 124 causes the reducing liquid 46 to be aspirated from the outlet 108 via the delivery pipe 156 into the delivery chamber 124.

During this process the outlet valve 150 remains open, while the inlet valve 148 is closed. Once the armature plate 118 has reached the end position, the valve 158 closes automatically. When the electromagnet 110 is re-energized, the reducing liquid 46 accommodated in the delivery chamber 124 is delivered out of the delivery chamber 124 in the direction of the inlet 104 due to the resultant reduction in volume of said chamber. During this process, the outlet valve 150 is conversely closed, while the inlet valve 148 remains open.

The stated procedures are repeated by periodic energization of the electromagnet 110 and corresponding activation of the inlet and outlet valves 148, 150 by means of the open- and/or closed-loop control unit until the reducing agent 46 has been completely aspirated out of the device and returned to the storage tank. Finally, the electromagnet 110 and the inlet and outlet valves 148, 150 are finally switched off by the open- and/or closed-loop control unit, wherein according to the invention the valve 158 ensures hermetic sealing of the inlet 104 even when the pump 100 is in the de-energized state.

Of crucial significance in achieving this reversal of delivery direction of the pump 100 (conveying direction ⇔ return direction) is the individual activation of the inlet valve 148 and the outlet valve 150 in conjunction with energization of the electromagnet 110 to move the armature plate 118 by means of corresponding signals from the open- and/or closed-loop control unit. Actuation of the valve 158, which in this variant embodiment functions as a backflow barrier according to the invention, proceeds purely passively through the upward and downward movement of the armature plate 118 with its conical raised portion 136 relative to the sealing edge 140.

All the components of the pump 100 which come into contact with the reducing agent 46 to be delivered ("AdBlue®" or urea/water (H₂O) solution), have to be made of sufficiently corrosion-resistant materials, such as for example thermoplastics, thermosetting plastics, titanium or stainless steel alloys, due to the high chemical activity of the reducing agent 46. In addition, the freezing point of the reducing agent 46 needs to be taken into account, to ensure the necessary ice-pressure resistance. Since thermal decomposition of the reducing agent 46 sets in above a temperature of 60° C. due to intensifying crystallization effects, precautions have to be additionally taken which counteract an excessive reducing agent 46 temperature.

As a result of the hermetically sealing valve 158 incorporated into the pump 100 in accordance with the invention, in particular during prolonged internal combustion engine shutdown, slow filling of the device with the reducing agent 46, in particular through not fully closing inlet and outlet valves 148, 150, after prior return of the reducing agent 46 into the storage tank 42, is reliably prevented in this second embodiment too. The valve 158 incorporated directly into the pump 100 as an active backflow barrier allows compact and at the same time inexpensive production of the device with simultaneously high variability of installation in the motor vehicle.

The invention claimed is:

1. A device (40) for reducing pollutants in the exhaust gas stream of an internal combustion engine, the device having a reducing agent (46) held in a storage tank (42) and a feed module for injecting the reducing agent (46) into the exhaust gas stream as well as a pump (56, 100) for delivering the reducing agent (46) from an intake point (62) in the storage tank (42) via at least one line (58, 66) to the feed module, characterized in that the pump (56, 100) is arranged below a reducing agent level (44) in the storage tank (42) and a backflow barrier is provided, wherein the backflow barrier is a valve (158) incorporated into the pump (100), and wherein the pump (100) comprises a housing top (102) with an inlet (104) and a housing bottom (106) with an outlet (108) for the reducing agent (46), wherein an electromagnet (110) with a magnetic core (112) and a cylindrical coil (114) is incorporated in the housing bottom (106), which electromagnet is covered with a nonmagnetic isolating disc (116), and a substantially disc-shaped armature plate (118) movable along a longitudinal axis (120) is arranged in the housing top (102), wherein a peripheral, resilient sealing membrane (122) is provided between the armature plate (118) and the isolating disc (116) to define at least in part a delivery chamber (124).

2. The device (40) as claimed in claim 1, wherein the isolating disc (116) and the magnetic core (112) each comprise a continuous isolating disc and magnetic core bore (126, 128), which are connected to the outlet (108) for the reducing agent (46).

3. The device (40) as claimed in claim 1, wherein a compression spring (132) is clamped between a magnetic core recess (130) and the armature plate (118) and the magnetic core (112) is sealed by a seal relative to the housing bottom (106).

4. The device (40) as claimed in claim 1, wherein the valve (158) is formed by a conical raised portion (136) of the armature plate (118), which comprises a continuous armature plate bore (138) to create a sealing edge (140), wherein the sealing edge (140) may be pressed by the compression spring (132), when the electromagnet (110) is in the de-energized state, with a defined contact pressure against a limit stop (142) in the housing top (102), to seal the inlet (104) hermetically.

5. The device (40) as claimed in claim 4, wherein an inlet valve (148) is provided in the region of the armature plate bore (138) and an outlet valve (150) is provided in the region of a magnetic core bore (128), these each being electrically actuatable independently of one another by at least one of an open-loop and a closed-loop control unit and the magnetic core bore (128) continuing into a delivery pipe (156) at the outlet (108).

6. The device (40) as claimed in claim 1, wherein the pollutants are nitrogen oxides.

7. The device (40) as claimed in claim 1, wherein the reducing agent (46)-includes a urea/water solution.

8. The device (40) as claimed in claim 1, wherein the feed module includes a nozzle (68).

9. The device (40) as claimed in claim 3, wherein the seal is an O-ring (134).

10. A device (40) for reducing pollutants in the exhaust gas stream of an internal combustion engine, the device having a reducing agent (46) held in a storage tank (42) and a feed module for injecting the reducing agent (46) into the exhaust gas stream as well as a pump (56, 100) for delivering the reducing agent (46) from an intake point (62) in the storage tank (42) via at least one line (58, 66) to the feed module, characterized in that the pump (56, 100) is arranged below a reducing agent level (44) in the storage tank (42) and a backflow barrier is provided, wherein the backflow barrier is a valve (158) incorporated into the pump (100), and wherein the pump (100) comprises a housing top (102) with an inlet (104) and a housing bottom (106) with an outlet (108) for the reducing agent (46), wherein an electromagnet (110) with a magnetic core (112) and a cylindrical coil (114) is incorporated in the housing bottom (106), which electromagnet is covered with a nonmagnetic isolating disc (116), and a substantially disc-shaped armature plate (118) movable along a longitudinal axis (120) is arranged in the housing top (102), wherein the valve (158) is formed by a conical raised portion (136) of the armature plate (118), which comprises a continuous armature plate bore (138) to create a sealing edge (140), wherein the sealing edge (140) may be pressed by the compression spring (132), when the electromagnet (110) is in the de-energized state, with a defined contact pressure against a limit stop (142) in the housing top (102), to seal the inlet (104) hermetically.

11. The device (40) as claimed in claim 10, wherein the isolating disc (116) and the magnetic core (112) each comprise a continuous isolating disc and magnetic core bore (126, 128), which are connected to the outlet (108) for the reducing agent (46).

12. The device (40) as claimed in claim 10, wherein a compression spring (132) is clamped between a magnetic core recess (130) and the armature plate (118) and the magnetic core (112) is sealed by a seal relative to the housing bottom (106).

13. The device (40) as claimed in claim 10, wherein an inlet valve (148) is provided in the region of the armature plate bore (138) and an outlet valve (150) is provided in the region of a magnetic core bore (128), these each being electrically actuatable independently of one another by at least one of an open-loop and a closed-loop control unit and the magnetic core bore (128) continuing into a delivery pipe (156) at the outlet (108).

14. The device (40) as claimed in claim 10, wherein the pollutants are nitrogen oxides.

15. The device (40) as claimed in claim 10, wherein the reducing agent (46)-includes a urea/water solution.

16. The device (40) as claimed in claim 10, wherein the feed module includes a nozzle (68).

17. The device (40) as claimed in claim 12, wherein the seal is an O-ring (134).

\* \* \* \* \*